United States Patent [19]
Priem

[11] Patent Number: 4,907,174
[45] Date of Patent: Mar. 6, 1990

[54] Z-BUFFER ALLOCATED FOR WINDOW IDENTIFICATION

[75] Inventor: Curtis Priem, Fremont, Calif.

[73] Assignee: Sun Microsystems, Inc., Mountain View, Calif.

[21] Appl. No.: 201,610

[22] Filed: Jun. 2, 1988

[51] Int. Cl.⁴ .................. G06F 15/62; G06F 15/72
[52] U.S. Cl. ................................. 364/521; 340/729; 340/747; 364/522
[58] Field of Search ............... 364/518, 521, 522; 340/729, 747, 750, 724

[56] References Cited

U.S. PATENT DOCUMENTS

| | | | |
|---|---|---|---|
| 4,609,917 | 9/1986 | Shen | 340/729 |
| 4,697,178 | 9/1987 | Heckel | 340/729 |
| 4,734,690 | 3/1988 | Waller | 340/729 |

Primary Examiner—Gary V. Harkcom
Assistant Examiner—Michael A. Jaffe
Attorney, Agent, or Firm—Blakely, Sokoloff, Taylor & Zafman

[57] ABSTRACT

Apparatus and methods for displaying two and three dimensional graphics within a plurality of windows on a display system. The display system includes a central processing unit (CPU) which provides RGB data to a bit-mapped display memory coupled to a cathode ray tube (CRT) display. A Z-buffer memory is provided with a Z-value for each RGB data point corresponding to a point on the object to be displayed. The Z-buffer is organized such that the value of the entire n bit buffer (0 through $2n-1$) identifies the window in which the graphics and/or text is displayed. For windows in which only two dimensional (2D) graphics/text is displayed, the Z-value is the same for both the window and each RGB point of the image. For windows which display three dimensional (3D) graphics, a range of Z-values for the buffer are provided which define the window boundaries. Images to be displayed within a 3D window must have Z-values which fall within the particular window's Z-value range. Within each window traditional Z-buffering techniques are utilized to provide hidden surface elimination. The apparatus and methods also permit the use of hither and yon planes to selectively view cross-sections of objects within a 3D window.

27 Claims, 5 Drawing Sheets

Z-BUFFER ALLOCATED FOR WINDOW IDENTIFICATION

BACKGROUND OF THE INVENTION

1. Field of the Invention

The present invention relates to apparatus and methods for displaying graphic information, and more particularly, to data processing apparatus and methods for generating and manipulating windows for the display of data on a computer display system.

2. Art Background

It is quite common in the computing industry to represent and convey information to a user through graphic representations. These representations may take a variety of forms, such as for example, alpha numeric characters, Cartesian or other coordinate graphs, as well as shapes of well known physical objects. A common method of interaction with a computer system is frequently referred to as an "object oriented" system in which many previously coded programming commands are replaced with two dimensional graphics on a computer display. A common object oriented interface utilizes multiple "windows" displayed on a cathode ray tube (CRT) in which combinations of text and graphics are used to convey information. Each window may take the form of a square or rectangle or, for example, a familiar object such as a file folder, which may overlap one another with the top fully visible window constituting the current work file. Text, two and three dimensional graphics, flow charts and the like may be displayed within each of the windows. The use of windows renders the computer system easier to operate, permits multiple programming applications to be executed in various windows, and provides a stronger man/machine interface.

Although a variety of graphic representations are desired in an object oriented environment, traditionally large amounts of memory have been required in order to generate, store and manipulate graphics characters. In addition, for three-dimensional ("3D") graphics applications, most systems utilize a Z-buffer for determining which points of a 3D graphics image are to be displayed and rendered visible to the user. (See, for example, U.S. Pat. Nos. 4,475,104, and 4,679,041, relating to Z-buffer based systems for displaying 3D images.) In systems which utilize multiple overlapping windows, the boundaries of the window must act to "clip" text and graphics in the various windows such that the contents of the window does not exceed the window boundary. In the case of a first window overlapping the contents of a second window, the text or graphics of the second window must be clipped so that it does not enter the boundaries of the first window, in order to protect the integrity of the window system. An example of a window display system is illustrated in FIG. 1, in which multiple windows (A through I) are displayed, and wherein each of the windows may contain text, or two or three dimensional graphic images.

Most display systems include a display memory which comprises a "bit map" wherein each memory bit is mapped onto a corresponding picture element (pixel) of the display. Thus an entire screen of data, in the form of images and/or text, is represented by one or more bits in a block of memory defining the bit map. Keeping track of each window, clipping the displayed data and or graphics to the window boundaries, and efficiently manipulating the windows which form a subset of the display memory has historically been a time consuming and complex task.

As will be described, the present invention provides a means whereby a Z-buffer may be used for window identification, window clipping, as well as hidden surface elimination in a graphics display. Moreover, the present invention permits the display of cross-sections of an object at a desired depth, within a window forming a part of the entire display screen.

SUMMARY OF THE INVENTION

The present invention discloses apparatus and methods for displaying two and three dimensional graphics within a plurality of windows on a display system. The display system of the present invention includes a central processing unit (CPU) which provides RGB data to a bit-mapped display memory coupled to a cathode ray tube (CRT) display. A Z-buffer memory is provided with a Z-value for each RGB data point corresponding to a point on the object to be displayed. The Z-buffer is organized such that the value of the entire n bit buffer (0 through $2^n - 1$) identifies the window in which the graphics and/or text is displayed. For windows in which only two dimensional (2D) graphics/text is displayed, the Z-value is the same for both the window and each RGB point of the image. For windows which display three dimensional (3D) graphics, a range of Z-values for the buffer are provided which define the window boundaries. Images to be displayed within a 3D window must have old Z-values previously stored in the Z-buffer which fall within the particular window's lower and upper Z-value range. Within each 3D window traditional Z-buffering techniques are utilized to provide hidden surface elimination. The present invention also permits the use of hither and yon planes to selectively view cross-sections of objects within a 3D window. The CPU provides hither and yon Z-values which fall within the window boundary range of Z-values and act as hither and yon clipping planes for the 3D image. An RGB point is displayed if:

(1) the Z-value of the point exceeds or equals the hither Z-value; and, (2) the Z-value of the point is less than or equal to the yon Z-value; and, (3) the Z-value of the point is less than the old Z-value previously stored in the Z-buffer; and, (4) the old Z-value exceeds or equals the lower window bounding Z-value; and, (5) the old Z-value is less than or equal to the upper window bounding Z-value.

DETAILED DESCRIPTION OF THE INVENTION

The present invention provides apparatus and methods for displaying text and graphics within identifiable and bounded windows on a display system. In the following description for purposes of explanation, numerous specific details are set forth, such as memory allocation, architectures, window numbers, etc., in order to provide a more thorough understanding of the present invention. However, it will be apparent to one skilled in the art that the present invention may be practiced without these specific details. In other instances, well known circuits and devices are shown in block diagram form in order not to obscure the present invention unnecessarily.

Figure 1:
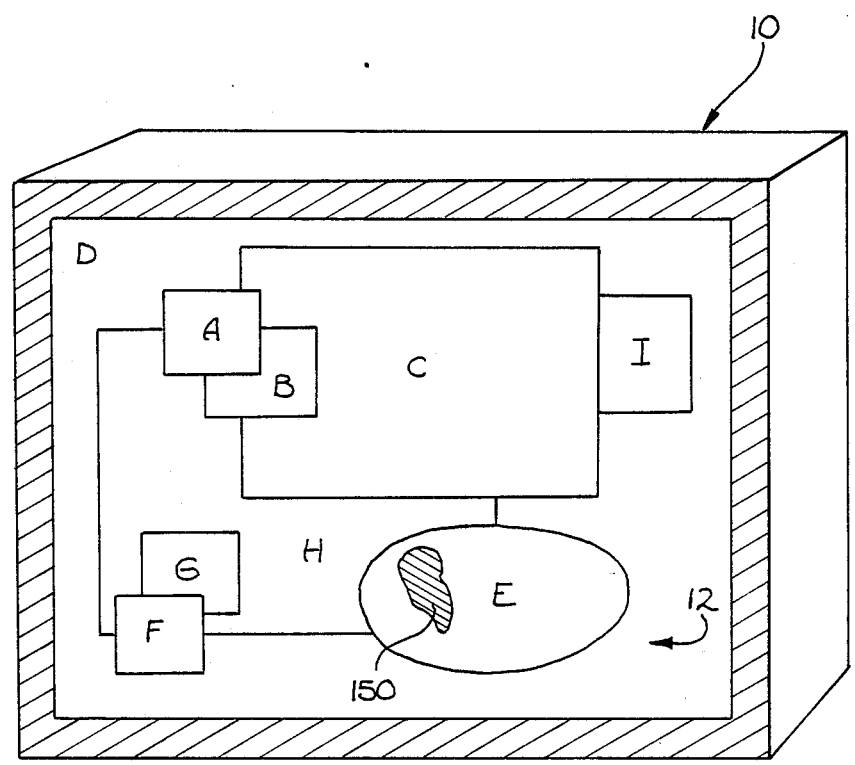
FIG. 1 illustrates a display having a plurality of overlapping windows which may contain text and/or graphics.

Referring to FIG. 1, a display 10 is illustrated which includes a cathode ray tube (CRT) screen 12 which is coupled, as will be described below, to a computer display system for the display of text and graphics to a user. The display of CRT 12, in the example illustrated, includes a plurality of overlapping windows (A through I) in which text, graphics (both two dimensional and three dimensional) and combinations thereof may be displayed. As illustrated, window "D" comprises a background window in which all other windows (A through C and E through I)of FIG. 1 are disposed. Historically, a variety of methods have been utilized in the prior art to display windows on a CRT and to "clip" the contents of the windows to the window boundaries. For example, in FIG. 1 the contents of window B must be clipped by the boundaries of window A, and similarly, the contents of window C are clipped by the boundaries of windows A and B. In those windows in which three dimensional images are to be displayed, Z-buffering is utilized to determine which points of an image are visible to the user and therefore what portions of the objects are displayed on CRT 12.

Figure 2:
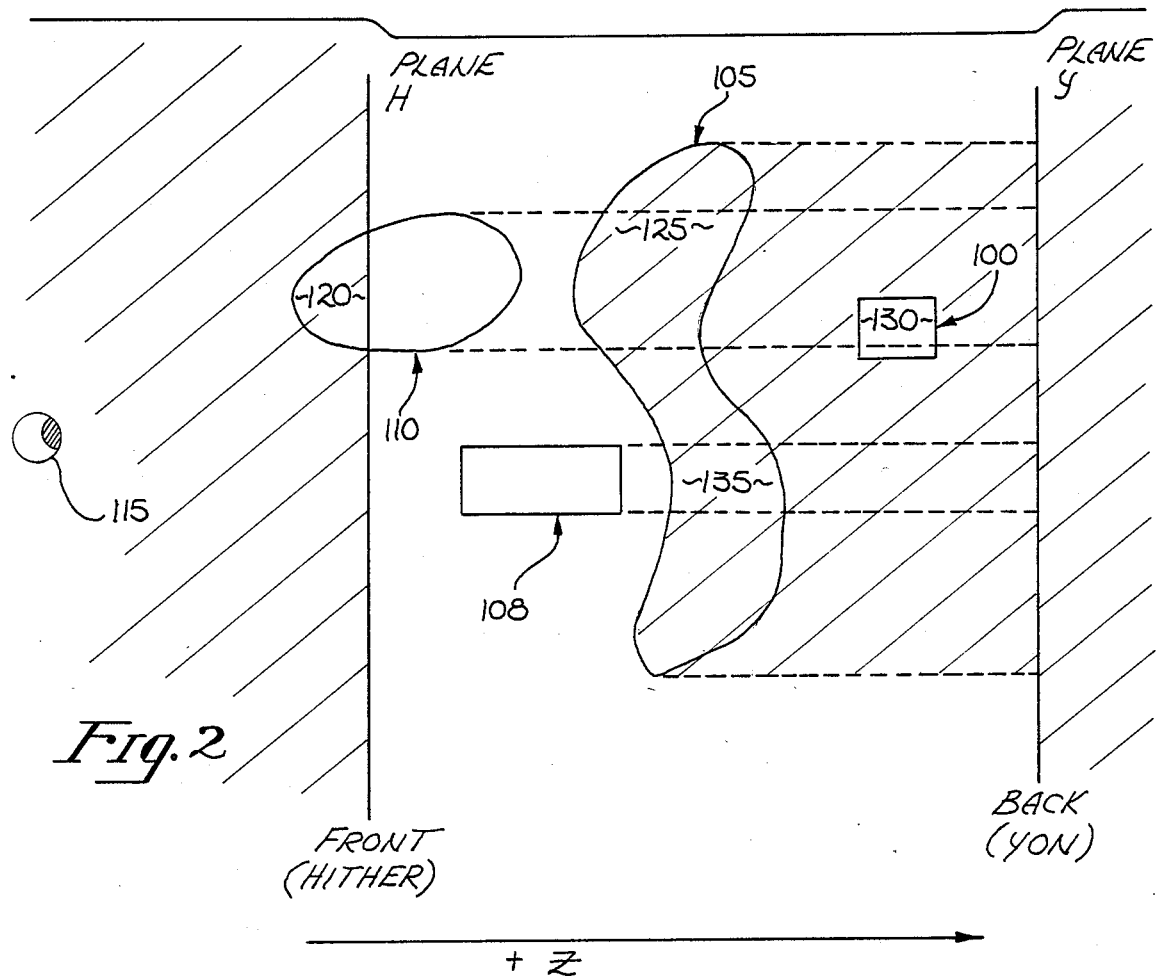
FIG. 2 is a conceptual illustration of the use of a Z-buffer and hither and yon planes to selectively display cross-sections of objects within a window to a user.

As will be described, the present invention provides apparatus and methods permitting the use of a display system's Z-buffer for both hidden surface elimination as well as window boundary clipping. The present invention further discloses an efficient system for keeping track of a plurality of windows displayed on CRT 12, without the necessity of providing separate window identification memory planes and identification numbers for each window, as required by other systems. Referring now to FIG. 2, the present invention incorporates clipping planes, the Z-value of which may be selectively altered to permit the viewing of cross-sections of objects to be displayed. FIG. 2 conceptually illustrates the use of a "hither" plane (plane H) and a "yon" plane (plane Y) for selectively viewing three dimensional objects on CRT 12. In the example shown, yon plane Y is set at a Z-value which constitutes the background Z plane. Objects 110, 105, 100, and 110 are to be drawn sequentially into a frame buffer for display on CRT 12. In the example the Z-value increases in the direction from the hither to the yon plane, wherein each of these planes has a predefined Z-value associated with it which provides a range between which objects may be displayed. It will be appreciated, however, that the present invention may equally be used in systems wherein the Z-value decreases in the direction from the hither to yon plane. Eye 115 denotes the eye of the user viewing CRT 12. In accordance with the present invention, each point (pixel) defining objects 100, 105, 108 and 110 has a corresponding Z-value relating the relative depth of that point of the object. Utilizing the teachings of the present invention, each pixel defining the objects of FIG. 2 would be "drawn" and displayed on CRT 12 if:

1. the Z-value of the pixel $\geq$ the Z-value of the hither plane H; and,
2. the Z-value of the pixel $\leq$ the yon plane Y; and,
3. the Z-value of the pixel $\leq$ the previous (old) Z-value stored in a Z-buffer.

In the example of FIG. 2, region 120 of object 110 fails to meet the constraint of inequality (1) and therefore is not displayed. Similarly, region 125 of object 105 fails to meet the third inequality (3) in that the Z-value of the pixels defining region 125 are not less than or equal to the old Z-values stored in the Z-buffer defining the pixels of object 110. Accordingly, object 110 effectively obscures the region 125 of object 105, and as will be appreciated, a corresponding smaller region 130 of object 100. Similarly, region 135 of object 105 is obscured by object 108 in accordance with the inequalities disclosed above. Moreover, it will be further noted that a cross-section of region 110 is displayed to the user due to the positioning of the hither plane H relative to the Z-values of object 110. Accordingly, by appropriately setting the Z-values for the hither and yon planes, cross-sections of three dimensional graphic images may be selectively defined and displayed to the user's eye 115. It must also be noted that the conditions 1 through 3, above are true for traditional Z buffering. However, it will be appreciated that the present invention is not limited to such a traditional approach. For example, the inequalities of conditions 1 through 3, above could be "less than or equal to" or "greater than or equal to", as may be appropriate for the specific implementation of the present invention.

Figure 3:
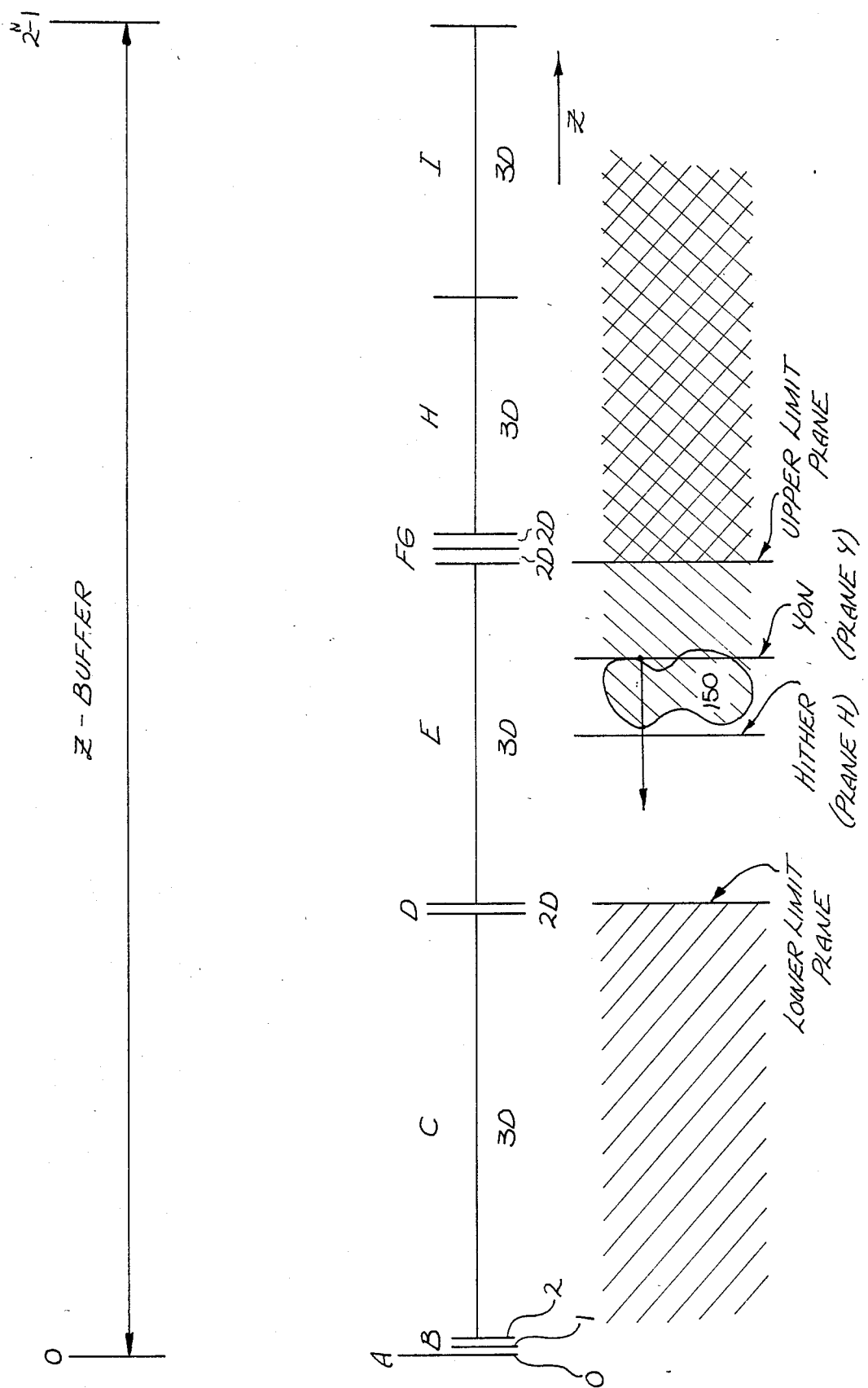
FIG. 3 illustrates the present invention's allocation of Z-buffer memory for window identification and, in the case of three dimensional graphics, Z-buffering.

Referring now to FIG. 3, the present invention will be described which provides a Z-buffer capable of identifying multiple windows on CRT 12, window boundary clipping capability, as well as a Z-buffer hidden surface elimination for windows in which 3D graphics are displayed. The Z-buffer of the present invention comprises a memory having n bits and addresses from, for example, 0 through $2^n - 1$. It will be appreciated that $2^n - 1$ represents a numerical value (in the presently preferred embodiment $2^{24} - 1$ with a twentyfour bit Z-buffer). The use of the total Z-buffer value, as opposed to an individual bit allocation within the Z-buffer, permits $2^n - 1$ window identification numbers, each window identification number corresponding to a unique window on CRT display 12. An example illustrating the use of the present invention's Z-buffer values to accomplish window identification and clipping, as well as hidden surface elimination is illustrated in the lower graph of FIG. 3. The letters A through I correspond in this example to windows A through I of FIG. 1.

In the example of FIG. 3, two dimensional windows, such as for example windows A, B, D, F and G are provided with a unique Z-buffer value which corresponds to a window identification number identifying the respective windows A, B, D, F and G. Similarly, three dimensional windows C, E, H and I are provided with a range of Z-buffer values which, as will be described more fully below, provide both window identification for window clipping boundaries, as well as Z-buffering (hidden surface elimination) for the display of three dimensional images on CRT 12. It is important to note that the range of, for example, window C in FIG. 3, represents a value for the entire Z-buffer, since in the present invention, the entire Z-buffer (having 0 through $2^{24}-1$ bits) corresponds to a quantifiable number. Accordingly, it will be appreciated that for any particular three dimensional window, for example, window E, the range of possible Z-values must be translated by the display system such that the Z-value falls within the Z-value range allocated for window E.

Referring once again to FIGS. 1 and 3, assume for sake of example that a three dimensional object 150 is to be drawn within window E. The window E includes a plurality of points previously drawn, each of which has a corresponding Z-value. In order for object 150 to be drawn within window E, the display system of the present invention must insure that the old Z-values, associated with each point which object 150 will modify, fall within the range of Z-buffer values allocated for use by window E. It will be appreciated that if the old Z-values of the display which object 150 will modify do not fall within the range of acceptable values for window E, that the present invention will not display the points comprising object 150. In those instances in which a two dimensional window is defined, such as for example windows F and G, text or graphics to be displayed in the 2D window is simply assigned a Z-value which corresponds to that particular window, since all points in the two dimensional window have the same Z-value.

The present invention's unique Z-buffer memory also permits the use of hither as well as yon planes for displaying cross-sections of three dimensional objects within windows. Referring again to FIG. 3, and as described above, three dimensional window E (see FIG. 1) is allocated a range of Z-buffer values wherein the lower value defines a lower limit plane for window E and the higher value defines an upper limit plane for the window E. A user may also define a Z-value falling within the range of Z-values associated with window E, which corresponds to a hither plane, and a separate value which corresponds to a yon plane. It will be appreciated by one skilled in the art that the display of an object 150 within window E requires that each point defining the three dimensional object have a Z-value which, using the present invention's convention, is greater than or equal to the hither plane, less than or equal to the yon plane, and less than or equal to the old Z-value for any objects which may have previously been displayed within the window E. By selectively choosing Z-values for the hither and yon planes, the present invention permits taking cross-sections of displayed objects. In addition, the use of the present invention's unique Z-buffer insures that window boundary integrity is maintained and appropriate clipping of overlapping windows is achieved.

Figure 4:
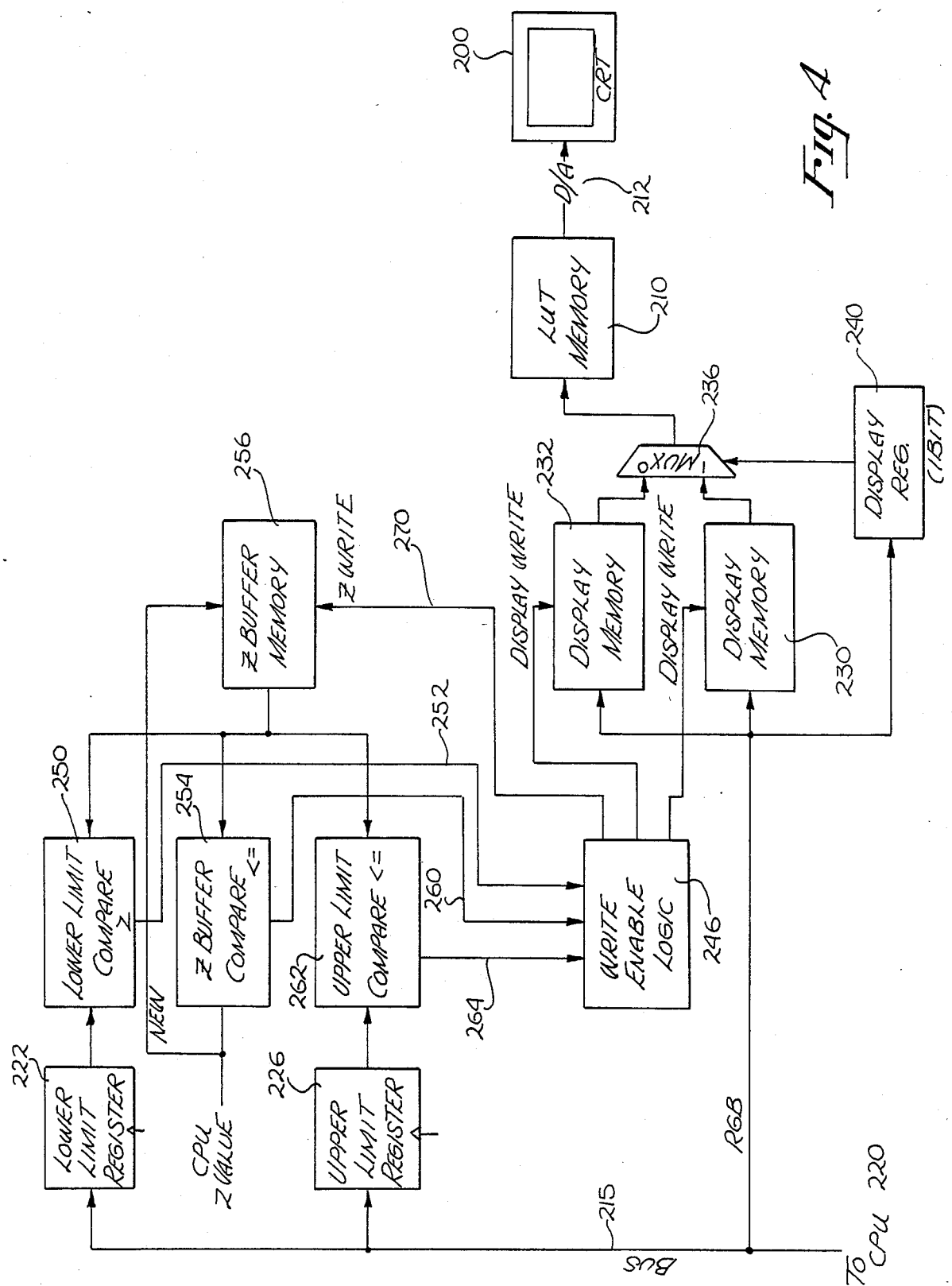
FIG. 4 is a block diagram of the present invention incorporated in a computer display system for displaying windows containing graphics and/or text.

Referring now to FIG. 4, a block diagram illustrating one embodiment of the present invention is disclosed. As illustrated, a CRT 200 is coupled to a look-up table (LUT) memory 210 through a digital to analog (D/A) convertor 212. A data bus 215 is coupled to a central processing unit (CPU) 220, a lower limit register 222 and an upper limit register 226. Bus 215 is further coupled to display memories 230 and 232, each of which comprise a bit map of the CRT display 200, such that there is a 1 to 1 correspondence between data stored in the display memories 232 and 230 with display elements ("pixels") comprising the CRT display 200. Display memories 232 and 230 are coupled through a multiplexor 236 to the LUT memory 210, such that the multiplexor selectively alternates between display memory 232 and display memory 230, as controlled by a display register 240 also coupled to bus 215. The use of two display memories permits "double buffering" such that while one memory is being updated, the second memory is displayed, thereby permitting computer animation and other well-known graphics techniques.

Display memories 232 and 230 are selectively enabled by write enable logic 246, such that data in the form of bits defining RGB ("Red-Green-Blue") values for each display element (pixel) on CRT 200 is written into the display memories only if the particular memory has received a coincident write enable signal from the write enable logic 246. In the event a write enable signal is not provided by the write enable logic 246, then the data on bus 215 is not written into the display memory (232 or 230) which does not receive the signal. Accordingly, it will be appreciated that using the present invention's double buffering architecture, data on bus 215 may be selectively written into one or both of the display memories simply by either providing or not providing a write enable signal to the particular memory from write enable logic 246.

As illustrated, lower limit register 222 is coupled to a lower limit comparator 250, the output of which is coupled to the write enable logic 246 by line 252. A Z-buffer comparator 254 receives a new Z-value from CPU 220 (lines not shown) and provides the new Z-value of the Z-buffer comparator 254 as well as a Z-buffer memory 256. The output of Z-buffer comparator 254 is coupled over line 260 to the write enable logic 246. An upper limit comparator 262 is coupled to upper limit register 226 as well as the Z-buffer memory 256, the output of which is coupled to write enable logic 246 over line 264. As illustrated, Z-buffer memory 256 is coupled to the lower limit comparator 250, the Z-buffer comparator 254 as well as the upper limit 262. Z-buffer memory takes the form of the Z-buffer previously described with reference to FIGS. 1, 2, and 3. The Z-buffer memory 256 is enabled by a signal from write enable logic 246 over line 270.

Referring once again to FIG. 4, in operation the CPU 220 provides RGB data for each display element (pixel) comprising a point on CRT 200 to display memories 232 and 230. In addition, the CPU 220 provides a control bit to display register 240 to control the selection of multiplexor 236 to define which display memory is to be coupled to the look-up table (LUT) memory 210 for subsequent display on CRT 200. For each RGB display element, CPU 220 provides a corresponding Z-value which is coupled to the Z-buffer memory 256 and to the Z-buffer comparator 254. The Z-buffer comparator 254 compares the "old" existing Z-value for the pixel location as stored in the Z-buffer memory 256 with the new Z-value provided by the CPU 220. If the new Z-value is less than or equal to the old Z-value for that pixel, then a signal is provided over line 260 to provide enable logic 246. Similarly, CPU 220 provides a Z-value constituting a lower limit to the lower limit register 222 over bus 215, and an upper limit register 226 (see FIG. 3) to define the Z-values delineating a window on CRT display 200. In the event the Z-buffer comparator 254 determines that the new Z-value is less than or equal to the old Z-value as provided by the Z-buffer memory 256, write enable logic 246 provides a Z-write signal over line 270, thereby updating the Z-value within the Z-buffer memory 256, and replacing the old value with the new value provided by the CPU 220. In order to insure that the pixel falls within the desired window (as defined by the lower and upper limit register values) the lower limit comparator 250 compares the old Z-value for the display element. In the event the old Z-value is greater than or equal to the lower limit register Z-value, a signal is provided on line 252 to the write enable logic 246. Similarly, upper limit comparator 262 compares the old Z-value to the upper limit Z-value stored in upper limit register 226, the value of which is provided by CPU 220. If the upper limit comparator determines that the old Z-value is less than or equal to the upper limit register Z-value, a signal is provided on line 264 to the write enable logic 246. It will be appreciated that in the present invention, all of the comparisons are done simultaneously, such that if all of the comparisons enable the WRITE then the new Z-buffer value is written to the Z-buffer.

In accordance with the teachings of the present invention, it will be further appreciated that only if the write enable logic 246 is provided with signals over lines 264, 260 and 252, that a write enable signal is issued to one or both of the display memories 232 and 230 and to the Z-buffer memory 256. The issuance of the write enable signal to a display memory results in the RGB value for the display element being written into the display memory for subsequent display on CRT 200. As best conceptually shown in FIG. 3, it is only if the old Z-value of a pixel defining a point on the three dimensional object falls between the lower limit and upper limit planes and in "front" of any other objects previously displayed within the window defined by the value of the lower and upper limit registers, that the point is displayed. In the case of a two dimensional window (for example, windows A and B of FIG. 3) the old Z-value for all text and/or graphics to be displayed within a two dimensional window is set by the CPU to be the same, and the lower and upper limit registers are also provided with the same Z-value, such that so long as the old Z-value is equal to the lower and upper limit register Z-values, the system insures that the two dimensional data is written into the proper window on CRT 200. Any attempt to write into a pixel with the old Z-value not equal to the lower and upper limit register values for the two dimensional data, will not result in the generation of a write enable signal, and the data will not be written into the display memories nor the new Z-value into the Z-buffer. Accordingly, the present invention insures that both two dimensional and three dimensional images are written only into the appropriate window on CRT 200 (CRT 12 in FIG. 1), while performing traditional Z-buffering in the case of three dimensional images.

Figure 5:
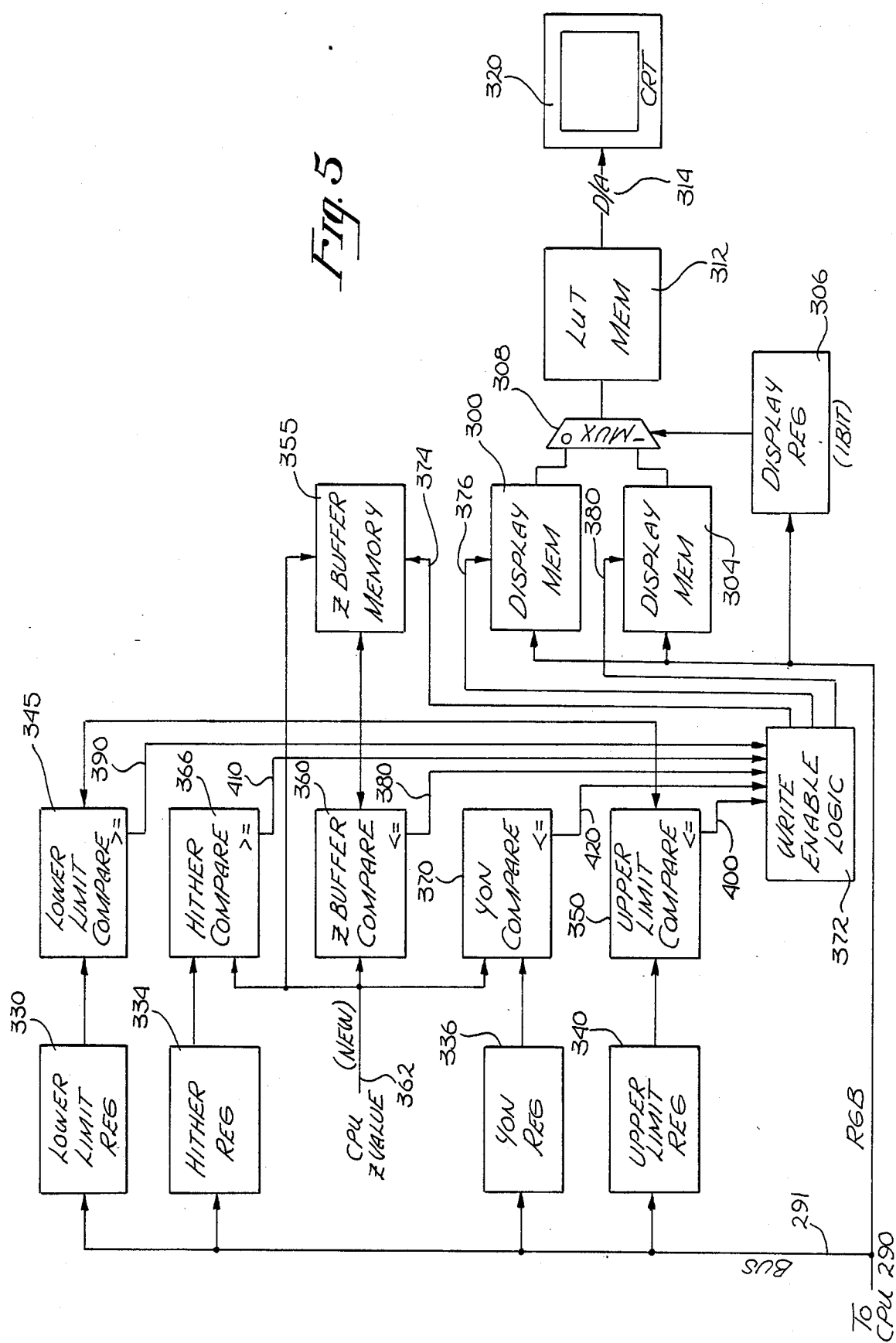
FIG. 5 is a block diagram of a system incorporating the teachings of the present invention in which hither and yon planes are utilized to display cross sections of three dimensional objects on a display.

Referring now to FIG. 5, an alternate embodiment of the present invention is illustrated in which the hither and yon planes are further added to permit the selected viewing of cross-sections of three dimensional objects displayed within a window. As in the embodiment of FIG. 4, CPU 290 provides RGB pixel data to display memories 300 and 304 over bus 291. A display register 306 is coupled to bus 291 to receive a control bit for selecting one of the display memories through a multiplexor 308. Multiplexor 308 is coupled to a LUT memory 312 and digital to analog (D/A) convertor 314, such that data stored in the display memories is displayed on CRT 320. Bus 291 is further coupled to a lower limit register 330, a hither register 334, a yon register 336 and an upper limit register 340, as illustrated in FIG. 5. As in the embodiment of FIG. 4, the lower limit register 330 is coupled to a lower limit comparator 345 and the upper limit register 340 is coupled to the upper limit comparator 350. A Z-buffer memory 355, having the nature and structure of the Z-buffer disclosed in FIG. 3, is coupled to a Z-buffer comparator 360 as well as the lower limit comparator 345 and upper limit comparator 350. Z-buffer memory 355 is also coupled to a line 362 on which is provided a new Z-value for the current pixel described by the RGB data on bus 291. New Z-values are provided by the CPU 290 (not shown) and are coupled to the Z-buffer comparator 360 and the Z-buffer memory 355, as well as a hither comparator 366 and yon comparator 370, as shown in FIG. 5. The outputs of the lower limit comparator 345, hither comparator 366, Z-buffer comparator 360, yon comparator 370 and upper limit comparator 350 are coupled to write enable logic 372. As illustrated, write enable logic 372 selectively provides write enable signals to the Z-buffer memory 355 over line 374, the display memory 300 over line 376, and the display memory 304 over line 380.

In operation, CPU 290 provides a pixel RGB value over bus 291 to the display memories 300 and 304. Z-buffer values defining the lower limit plane (see FIG. 3) and the upper limit plane are provided by the CPU to the lower limit register 330 and the upper limit register 340. The values in the lower limit register and upper limit register define which window on CRT 320 is selected (see FIG. 1). In addition, CPU 290 provides a Z-value defining the hither plane to hither register 334, and the Z-value for the yon plane to yon register 336. As previously described with respect to FIG. 3, the hither and yon planes may be utilized by the present invention to selectively display cross-sections of three dimensional objects within a window. For each RGB pixel value provided by the CPU 290 to the display memories, a new Z-value for that pixel is provided over line 362. The new Z-value is coupled to the hither comparator 366, yon comparator 370, Z-buffer comparator 360 and the Z-buffer memory 355.

As described with reference to FIG. 4, the Z-buffer comparator 360 compares the new Z-value for that pixel location with the old Z-value previously stored in the Z-buffer memory 355. If the new Z-value is less than or equal to the old Z-value stored in Z-buffer memory 355, comparator 360 provides a signal over line 380 to the write enable logic 372. Similarly, the lower limit comparator 345 compares the value stored in the lower limit register 330 with the old Z-buffer memory value for the particular pixel location. If the old Z-value is greater than or equal to the Z-value stored in the lower limit register 330, then lower limit comparator 345 provides a signal over line 390 to the write enable logic 372. Similarly, upper limit comparator 350 compares the upper limit Z-value stored in register 340 with the old Z-buffer memory value for the particular pixel and, if the value stored in Z-buffer 355 is less than or equal to the value stored in the upper limit register 340, a signal is provided over line 400 to the write enable logic 372. The generation of signals on lines 390 and 400 by the respective comparators indicate that the pixel location identified by the RGB value falls within the selected window.

Hither comparator 366 compares the new Z-value for the pixel identified by the RGB data with the Z-value stored in the hither register 334. If the new Z-value is greater than or equal to the value stored in hither register 334, then a signal is provided over line 410 to the write enable logic 372. Yon comparator 370 compares the new Z-value provided over line 362 with the value stored in yon register 336, and, if the new Z-value is less than or equal to the value stored in the yon register 336, the comparator 370 provides a signal over line 420 to the write enable logic 372. In the presently preferred embodiment, the hither and yon registers and comparators may be selectively disabled by a user, or, alternatively set to the same respective values as the lower limit register and upper limit register of FIG. 5 to effectively disable them, if desired.

In the event that signals are provided on lines 380, 390, 400, 410 and 420 by the respective comparators, to the write enable logic 372, then the write enable logic 372 updates the Z-buffer memory with the new Z-value and selectively enables one of the display memories, such that the RGB data for the pixel is written into the memory for subsequent display. However, if any one of the lines 380, 390, 400, 410, or 420 is not enabled, then write enable logic 372 does not update the Z-buffer memory with the new Z-value nor does it enable the display memories and the RGB pixel data is not written into the display memories and will not be displayed.

Accordingly, it will be appreciated by one skilled in the art that the present invention allocates, clips, and selectively displays data in a plurality of windows defined as discrete values of the entire Z-buffer memory. Unlike other systems which utilize the Z-buffer memory as a bit map, or sequential list of Z-values, the present invention's Z-buffer memory describes windows with one or more Z-buffer values, and thereby permits multiple two and three dimensional windows on a CRT to be simultaneously displayed. While the present invention has been particularly described with reference to FIGS. 1–5, it will be understood that the figures are for illustration only, and should not be taken as limitations on the invention. It is contemplated that many changes and modifications may be made by one of ordinary skill in the art, without departing from the spirit and scope of the invention as disclosed above.

I claim:

1. A computer display system including a central processing unit (CPU) for providing data representing images comprised of a plurality of points, and display means for displaying said images, said display means including a plurality of selectively enabled display elements, comprising:

display memory means coupled to said CPU and to said display means for storing said data representing said plurality of points, each of said points having an address in said memory means and corresponding to a display element on said display;

Z-buffer means for storing Z-values, said Z-buffer means comprising N bits, the numerical value of said Z-buffer corresponding to a predetermined area on said display and at least one predetermined address in said display memory means, said Z-values being provided by said CPU for said plurality of points defining an image;

Z-value comparator means coupled to said Z-buffer means for comparing a new Z-value provided by said CPU for a point to be displayed with a corresponding old Z-value stored in said Z-buffer means, said Z-value comparator means providing a first signal if said new Z-value satisfies a predetermined inequality equation with respect to said old Z-value, and in such event replacing said old Z-value with said new Z-value in said Z-buffer means;

limit comparator means coupled to said CPU and said Z-buffer means for receiving an upper and a lower limit Z-value from said CPU defining said predetermined area on said display and comparing said old Z-value with said upper and lower limit Z-values, said limit comparator means providing a second signal if said old Z-value falls between said upper and lower limit Z-values;

write enable means coupled to said display memory means, said limit comparator means and said Z-value comparator means, for receiving said first and second signals, said write enable means providing a third signal to said display memory means upon the receipt of said first and second signals, said third signal resulting in said data corresponding to said new Z-value being stored in said display memory means;

video means coupled to said display memory means for displaying data stored in said display memory means on said display means;

whereby points comprising an image are displayed in a predefined area of said display as defined by their Z-values.

2. The computer display system as defined by claim 1, wherein if said image displayed within said predetermined area is two dimensional, said upper and lower limit Z-values and said Z-values provided by said CPU are the same.

3. The computer display system as defined by claim 1, wherein said predetermined area comprises a window in which said images are displayed.

4. The computer display system as defined by claim 3, wherein said Z-buffer means comprises a Z-buffer memory.

5. The computer display system as defined by claim 4, wherein said display memory means includes a first display memory bit mapped to said display.

6. The computer display system as defined by claim 5, wherein said display memory further includes a second display memory bit mapped to said display, said write enable means selectively alternating between said first and second memories for the display of said images on said display means.

7. The computer display system as defined by claim 6, wherein said predefined area comprises a window in which said images are displayed.

8. The computer display system as defined by claim 7, further including a register coupled to said upper and lower limit comparators and said hither and yon comparators for storing said respective Z-values provided by said CPU.

9. The computer display system as defined by claim 3, wherein said limit comparator means further receives a hither Z-value from said CPU, said hither Z-value falling between said lower and upper limit Z-values.

10. The computer display system as defined by claim 9, wherein said limit comparator means further receives a yon Z-value from said CPU, said yon Z-value falling between said hither Z-value and said upper limit Z-value.

11. The computer display system as defined by claim 10, wherein said limit comparator means provides a fourth signal to said write enable means if said new Z-value falls between said hither and yon Z-values, said write enable means only then providing said third signal, thereby resulting in said new Z-value being stored in said display memory means.

12. The computer display system as defined by claim 11, wherein said limit comparator means includes a lower limit comparator for comparing said lower limit Z-value to said old Z-value.

13. The computer display system as defined by claim 12, wherein said limit comparator means further includes an upper limit comparator for comparing said upper limit Z-value to said old Z-value.

14. The computer display system as defined by claim 13, wherein said limit comparator means includes hither and yon comparators for comparing said hither and yon Z-values to said new Z-values.

15. The computer display system as defined by claim 1, wherein said Z-value comparator means provides said first signal if said new Z-value is less than said old Z-value.

16. The computer display system as defined by claim 1, wherein said Z-value comparator means provides said first signal if said new Z-value is greater than said old Z-value.

17. The computer display system as defined in claim 1, wherein said Z-value comparator means provides said first signal if said new Z-value is equal to said old Z-value.

18. The computer display system as defined by claim 1, wherein said Z-value comparator means provides said first signal if said new Z-value is greater than or equal to said old Z-value.

19. In a computer display system including a central processing unit (CPU) for providing data representative of images comprised of a plurality of points, and display means for displaying said images, said display means including a plurality of selectively enabled display elements, a method for displaying said images comprising the steps of:
  storing said data representing said plurality of points in display memory means, each of said plurality of points having an address in said memory means and corresponding to a display element on said display;
  providing a Z-buffer for storing Z-values provided by said CPU for said points defining an image, said Z-buffer comprising N bits, the numerical value of said Z-buffer corresponding to a predetermined area on said display and at least one address in said display memory means;
  comparing a new Z-value provided by said CPU for a point to be displayed with a corresponding old Z-value stored in said Z-buffer;
  generating a first signal if said new Z-value satisfies a predetermined inequality equation with respect to said old Z-value and replacing said old Z-value with said new Z-value in said buffer means;
  receiving an upper and a lower limit Z-value from said CPU defining said predetermined area on said display and comparing said old Z-value with said upper and lower limit Z-values;
  generating a second signal if said old Z-value falls between said upper and lower limit Z-values;
  coupling said first and second signals to write enable means coupled to said display memory means, said write enable means generating a third signal and coupling said third signal to said display memory means resulting in said data corresponding to said new Z-value being stored in said display memory means;
  displaying said data stored in said display memory means on said display means.

20. The method as defined by claim 19, wherein said first signal is generated if said new Z-value is less than said old Z-value.

21. The method as defined by claim 19, wherein said first signal is generated if said new Z-value is equal to said old Z-value.

22. The method as defined by claim 19, wherein said first signal is generated if said new Z-value is greater than said old Z-value.

23. The method as defined by claim 19, wherein if said image displayed within said predetermined area is two dimensional, said upper and lower limit Z-values and said Z-values provided by said CPU are the same.

24. The method as defined by claim 19, wherein said predetermined area comprises a window in which said images are displayed.

25. The method as defined by claim 19, further including the step of receiving a hither Z-value from said CPU, said hither value falling between said lower and upper limit Z-value.

26. The method as defined by claim 25, further including the step of receiving a yon Z-value from said CPU, said yon Z-value falling between said hither Z-value and said upper limit Z-value.

27. The method as defined by claim 25, further including the step of providing a fourth signal to said write enable if said new Z-value falls between said hither and yon Z-values, said write enable means only then providing said third signal, thereby resulting in said new Z-value being stored in said display memory means.

* * * * *